(12) United States Patent
Tasanont

(10) Patent No.: US 7,267,098 B1
(45) Date of Patent: Sep. 11, 2007

(54) VORTEX GENERATING AIR INTAKE DEVICE

(76) Inventor: Addy Tasanont, 3135 La Clede Ave., Los Angeles, CA (US) 90039

( * ) Notice: Subject to any disclaimer, the term of this patent is extended or adjusted under 35 U.S.C. 154(b) by 0 days.

(21) Appl. No.: 11/506,480

(22) Filed: Aug. 19, 2006

(51) Int. Cl.
  *F02B 31/04* (2006.01)
  *F15D 1/02* (2006.01)
(52) U.S. Cl. .......................... 123/306; 123/590; 138/37
(58) Field of Classification Search ................ 123/306, 123/590, 592, 593; 138/37, 39
  See application file for complete search history.

(56) References Cited

U.S. PATENT DOCUMENTS

| | | | |
|---|---|---|---|
| 4,159,899 A | 7/1979 | Deschenes | |
| 4,436,481 A * | 3/1984 | Linder | 138/37 |
| 5,113,838 A | 5/1992 | Kim | |
| 5,947,081 A | 9/1999 | Kim | |
| 5,966,937 A * | 10/1999 | Graves | 60/748 |
| 5,979,395 A | 11/1999 | Mallen et al. | |
| 6,158,412 A | 12/2000 | Kim | |
| 6,209,528 B1 * | 4/2001 | Kondo | 123/565 |
| 6,536,420 B1 | 3/2003 | Cheng | |
| 6,550,446 B1 | 4/2003 | Robley, Jr. | |
| 6,928,979 B2 | 8/2005 | Chen | |
| 2005/0098147 A1 | 5/2005 | Kim | |

* cited by examiner

*Primary Examiner*—Hieu T. Vo
(74) *Attorney, Agent, or Firm*—Patel & Alumit, P.C.; Edwin Tarver

(57) ABSTRACT

A device for generating a vortex of the airflow passing through an air intake passage of an engine. The device comprises a cylindrical skirt, a plurality of holes in the cylindrical skirt and a plurality of vanes projecting inwardly from the inner surface of the cylindrical skirt. Each of the holes is defined by at least bottom, top, first and second side edges. Each of the vanes comprise a first planar section projecting at an angle from the first edge of the hole and a second planar section projecting at an angle from the first planar section. The device can be installed inside any cylindrical air intake passage. The orientation of the first and second planar sections of the vanes helps in converting the random airflow into a regular swirling motion, which increases the oxidation of fuel and improves the efficiency and fuel economy of the engine.

16 Claims, 9 Drawing Sheets

VORTEX GENERATING AIR INTAKE DEVICE

CROSS-REFERENCE TO RELATED APPLICATION

None

FEDERALLY SPONSORED RESEARCH

Not Applicable

SEQUENCE LISTING OR PROGRAM

Not Applicable

STATEMENT REGARDING COPYRIGHTED MATERIAL

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND

The present invention relates in general to air intake systems for internal combustion engines, and more particularly to an air intake device for manipulating and creating a vortex of air passing through the air intake of an engine.

In internal combustion engines, air enters the combustion chamber through the intake stroke of the piston and mixes with fuel for oxidation. Fuel efficiency can be increased by thoroughly mixing the air and fuel in the combustion chamber. By causing the airflow to swirl in a vortex configuration, it mixes more readily with fuel, and has a greater chance of completely mixing with and oxidizing fuel. For this reason, air intake devices for directing the airflow into a vortex or swirling configuration are used with the engines.

Several air intake devices for manipulating the airflow have been developed in art. For example, U.S. Pat. No. 6,536,420 to Cheng discloses a device that imparts swirl to an air intake charge. The device is formed from a single sheet of a flexible, bendable material into a substantially cylindrical body which is open at both ends. A plurality of stationary vanes are provided integral with and formed from the sidewall of the body. The vanes are constructed by cutting the sidewall followed by bending them inwardly toward the central axis of the cylinder. Each vane is disposed at an oblique angle with respect to a plane parallel to and passing through the cylindrical body's axis, for changing the direction of air flow and to encourage swirl in the air flow.

U.S. Pat. No. 5,947,081 to Kim discloses an air flow system for an internal combustion engine. The system comprises a cylindrical air cleaner divided into a centrally disposed air swirling zone and a laterally disposed filter zone. The swirling device has plurality of vanes that extend toward its periphery in a radial orientation for increasing airflow. The vanes include at least one elongated slit and at least one groove for increasing air flow through the air cleaner and for reducing air flow resistance. When air is introduced into the air swirling zone through the filter zone, a swirling force is generated which is retained by the reduced resistance created in the air flow through the vane members.

U.S. Pat. No. 6,550,446 to Robley discloses an air intake flow device to manipulate the airflow in an air entry chamber of an internal combustion engine. The device is comprised of a cylindrical skirt defining an airflow passageway and multiple vanes protruding inwardly from the inner surface of the skirt toward the center of the air entry chamber. Each vane is slanted at an angle to the direction of the airflow. The vanes are planar triangular with a first side first side disposed against the skirt, a second side disposed facing upstream into the airflow and a third side facing downstream of the airflow. The device can be constructed from a rectangular plate.

Although the above devices are design to serve a similar purpose, the object of the present invention is to provide a vortex generating air intake device that improves and increases the vortex of air traveling through an air intake. A further object of the present invention is to provide a vortex generating air intake device with a variable angular construction for the vanes. Other objects of the present invention will become better understood with reference to the appended Summary, Description, and Claims.

SUMMARY

The present invention is a device for creating an airflow vortex passing through the air intake of an engine. The device can be installed after the air filter in any cylindrical air intake passage. The device comprises a cylindrical skirt, a plurality of holes on the cylindrical skirt and a plurality of identical vanes projecting inwardly toward the center of the cylindrical skirt.

The holes are symmetrically located and disposed between top and bottom edges of the cylindrical skirt. The holes comprise a first edge, a second edge, a bottom edge and a curved top edge. Each of the vanes can be divided into a first planar section and a second planar section. The first planar section comprises first, second, top and bottom sides. The first planar sections are slanted at an angle and project perpendicularly with respect to the cylindrical skirt from the first edges of the holes. The second planar section is substantially triangular and projects at an angle from the top side of the first planar section. The top portion of the second planar section comprises a curved side. The orientations of the first and second planar sections facilitate in converting the airflow into vortex configuration.

The device can be constructed from a stainless steel plate by forming a plurality of cuts, bending the resultant cut sections to form the vanes and holes, and then rolling the plate to assume a cylindrical configuration.

FIGURES—REFERENCE NUMERALS

10 . . . Device of the Present Invention
11 . . . Cylindrical Skirt
12 . . . Hole 13 ... Vane
14 ... Top Edge of the Cylindrical Skirt
15 ... Bottom Edge of the Cylindrical Skirt
16 ... Slit in the Cylindrical Skirt
17 ... Longitudinal Axis
18 ... First Side Edge of the Hole
19 ... Second Side Edge of the Hole
20 ... Curved Top Edge of the Hole
21 ... Bottom Edge of the Hole
22 ... First Planar Section
23 ... Second Planar Section
24 ... First Side of the First Planar Section
25 ... Second Side of the First Planar Section
26 ... Bottom Side of the First Planar Section
27 ... Top Side of the First Planar Section
28 ... Curved Side of the Second Planar Section
29 ... Side Edge of the Plate

DETAILED DESCRIPTION

Figure 1:
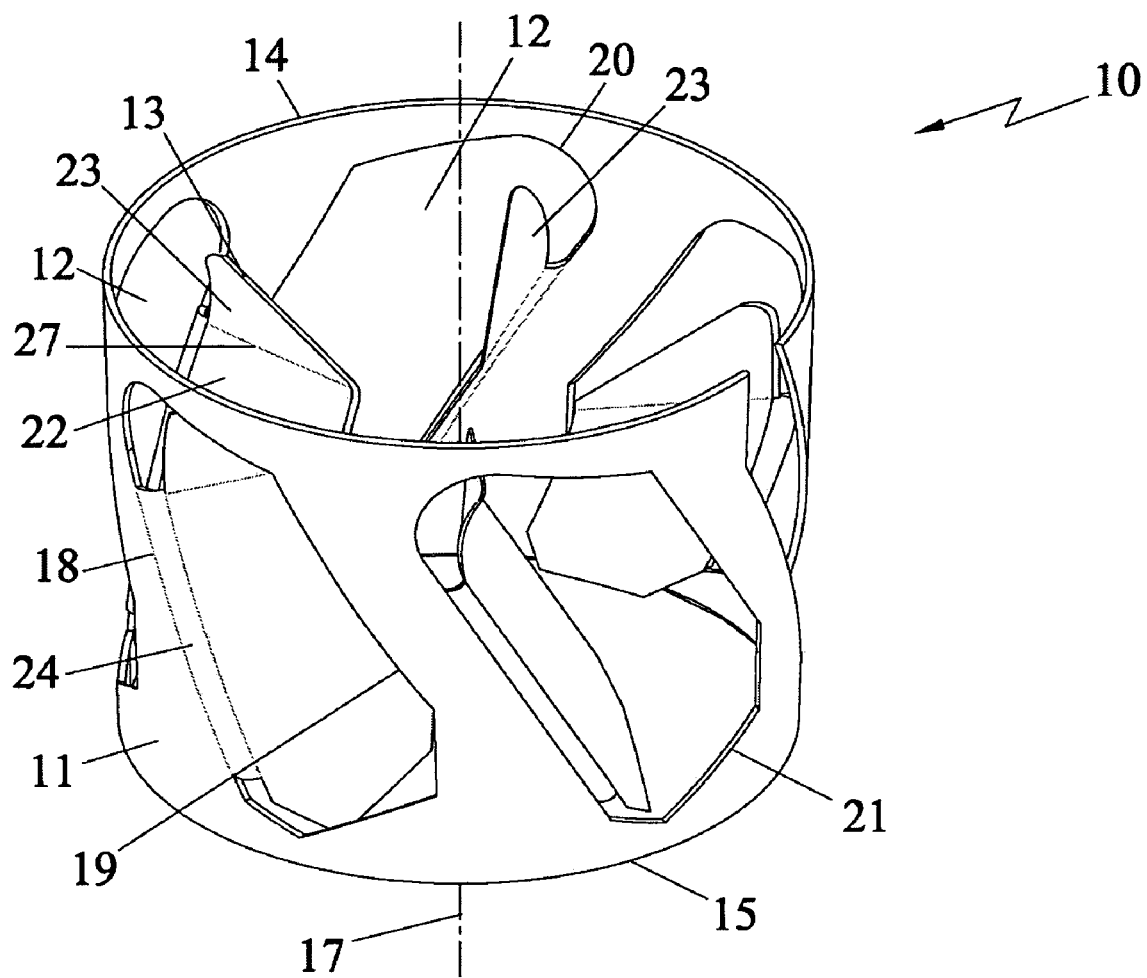
FIGS. 1 and 2 are front perspective views of vortex generating device of the present invention.
Figure 2:
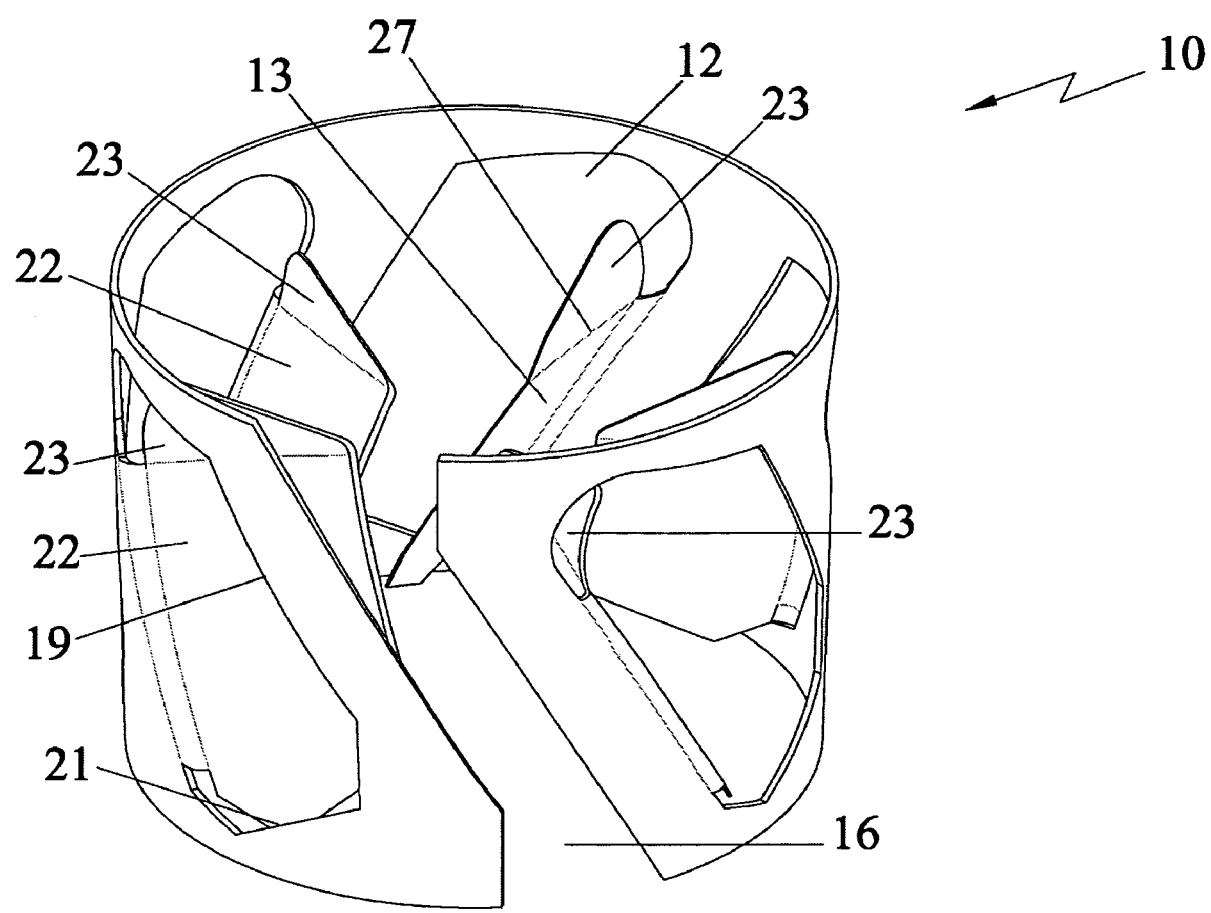
Figure 3:
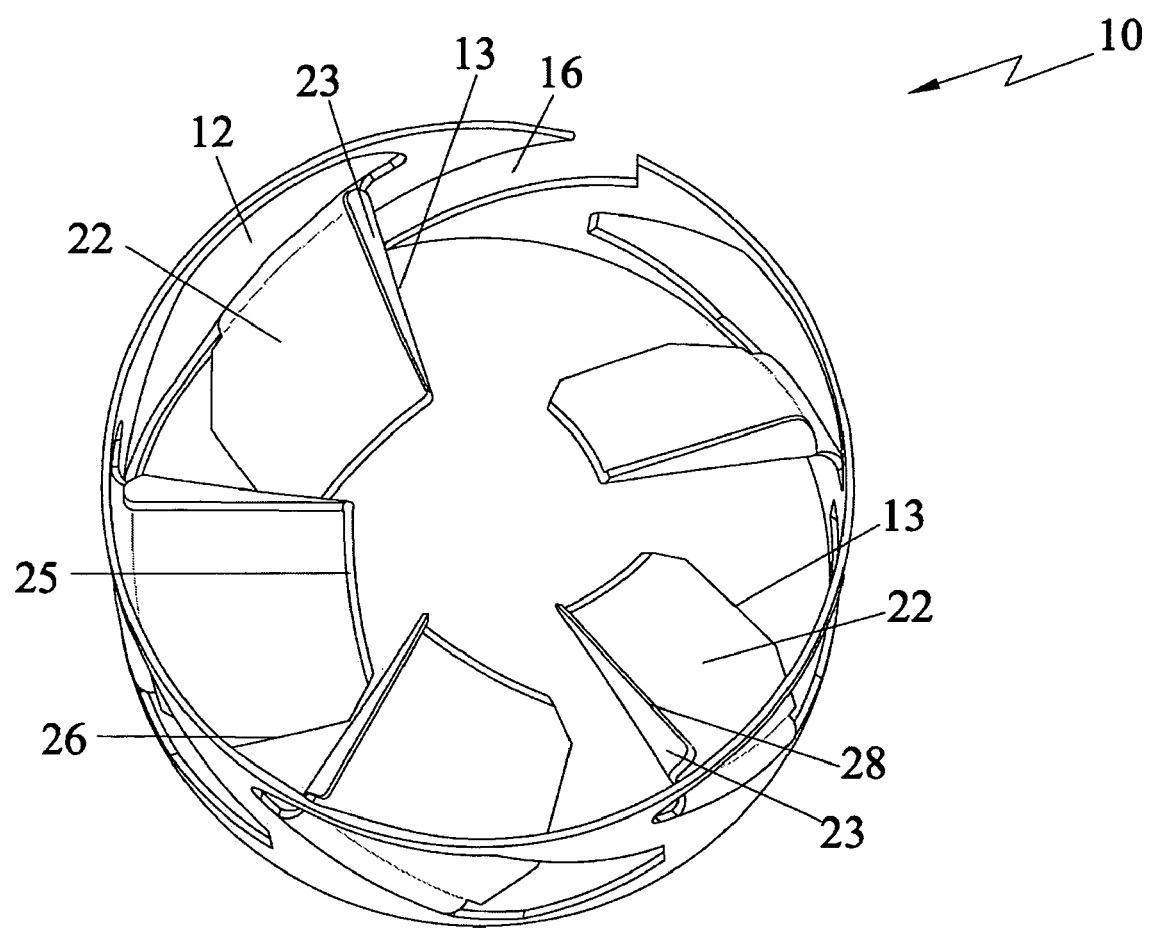
FIGS. 3 and 4 are top perspective views of vortex generating device of the present invention.
Figure 4:
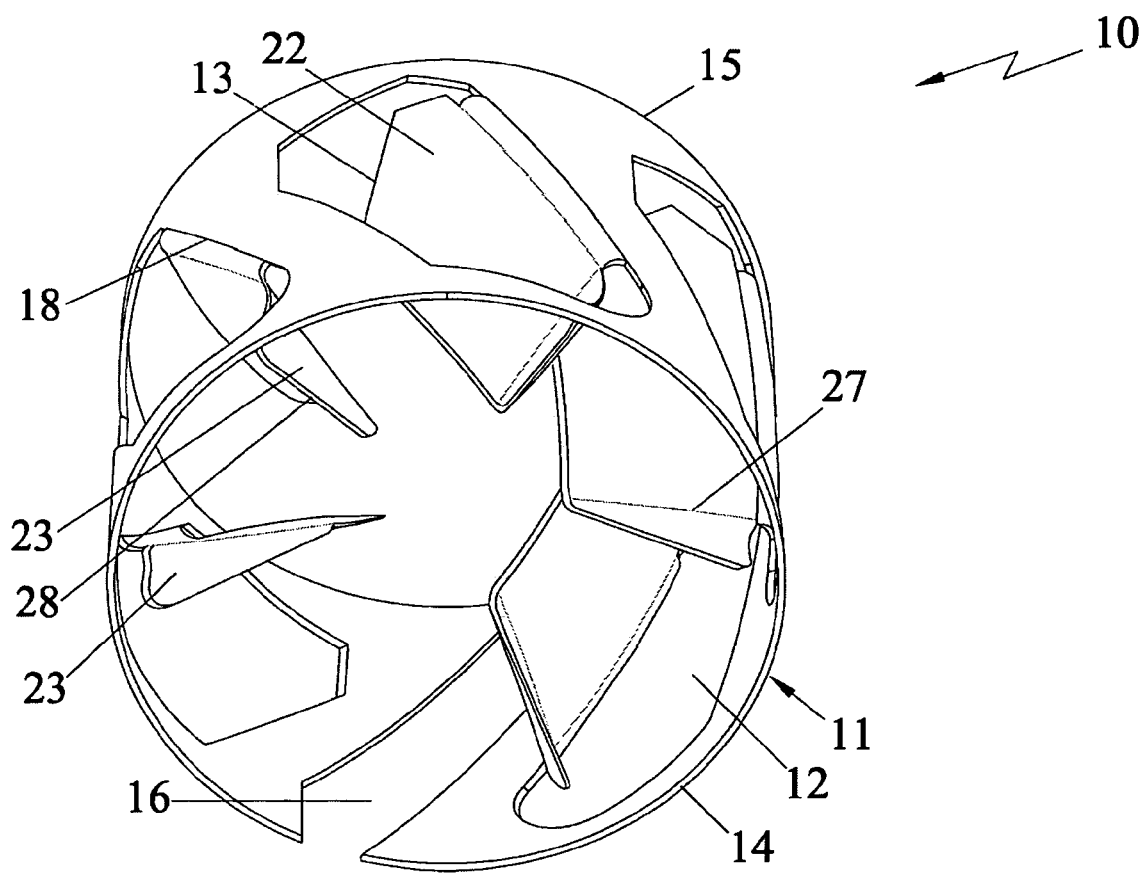
Figure 5:
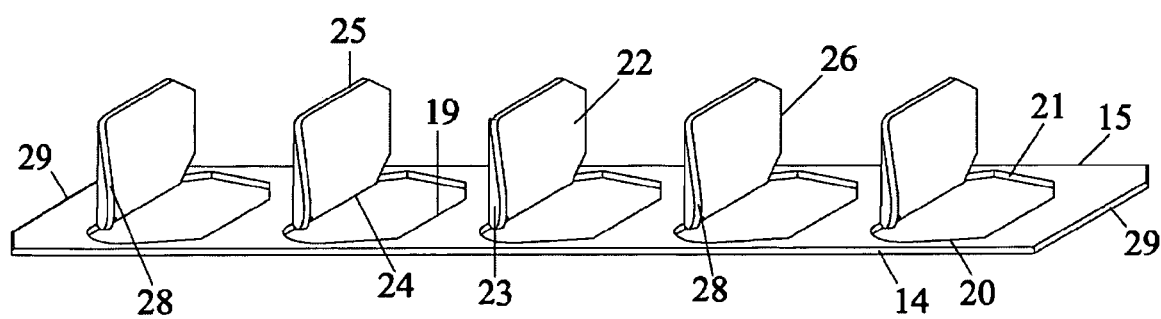
FIGS. 5, 6 and 7 are perspective views of the vortex generating device in its unfolded condition.
Figure 6:
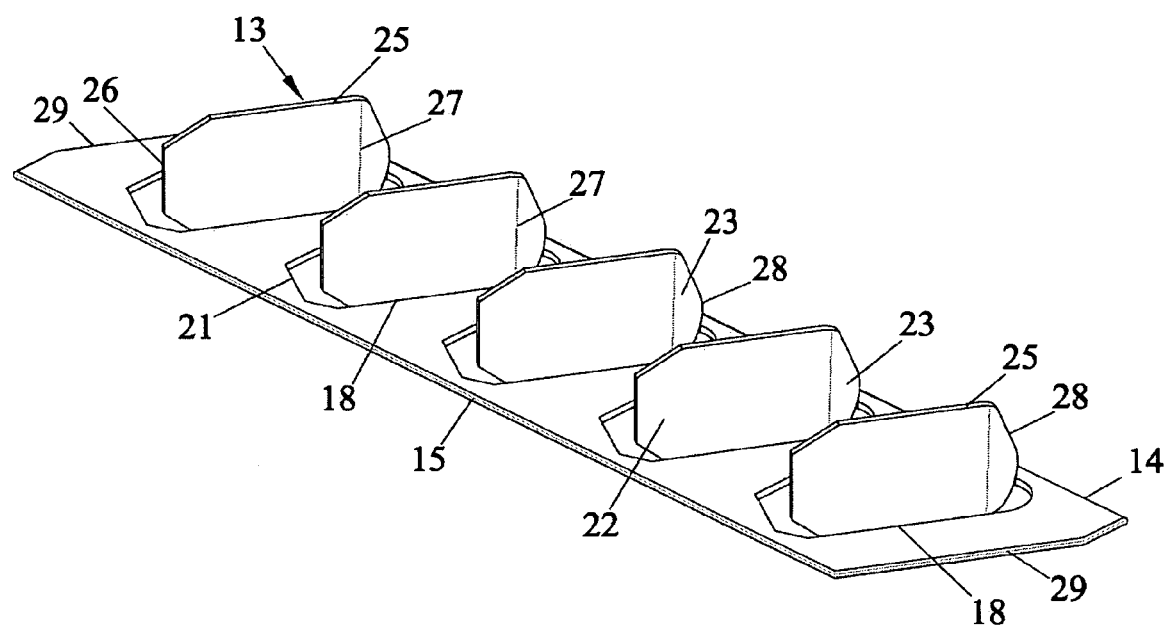
Figure 7:
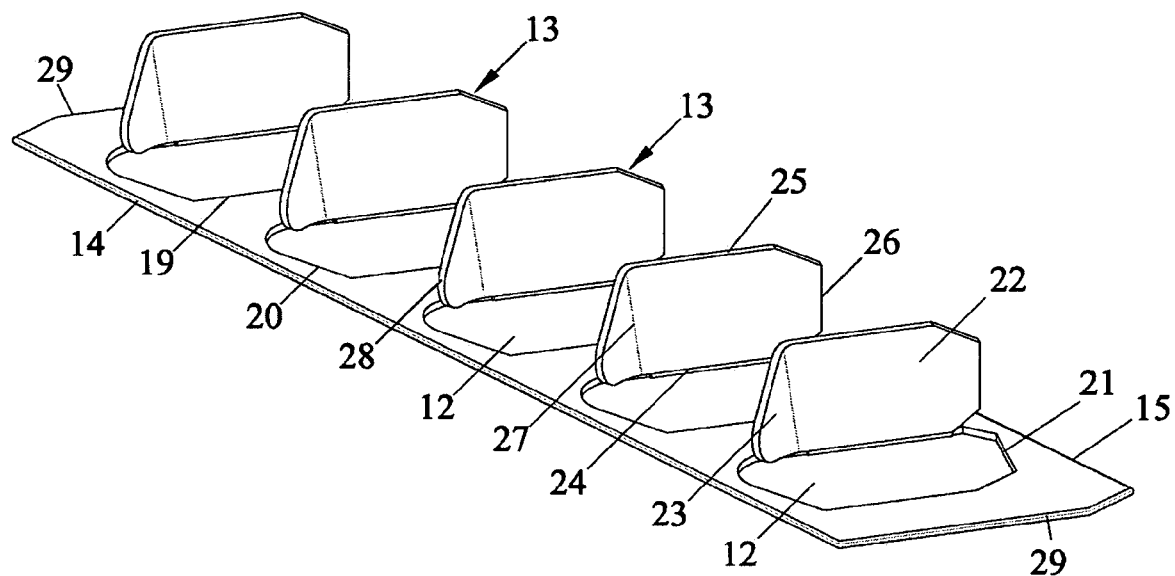
Figure 8:
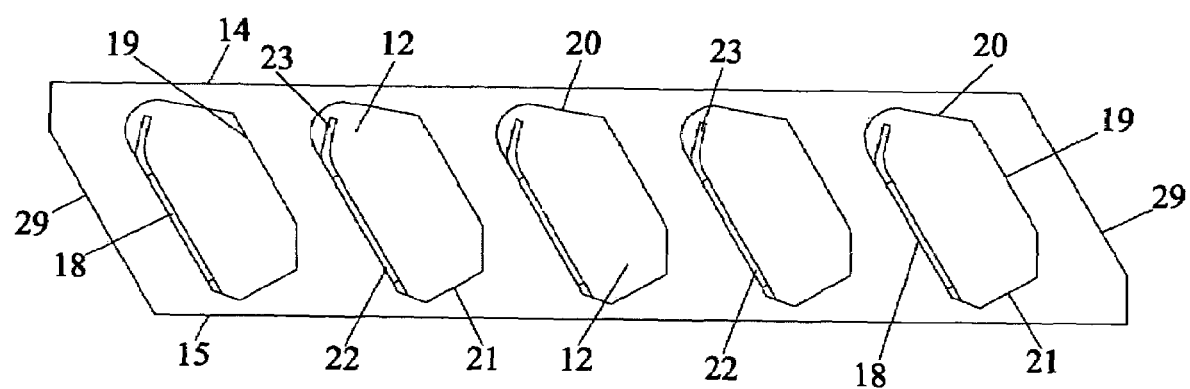
FIG. 8 is a top view of the vortex generating device in its unfolded condition.
Figure 9:
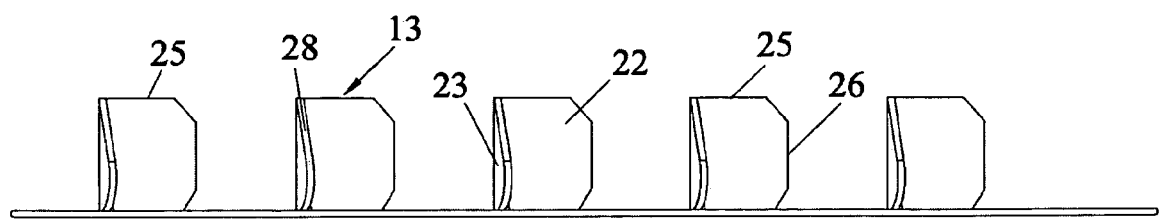
FIG. 9 is a side view of the vortex generating device in its unfolded condition.

Referring to the drawings, a preferred embodiment of a device for directing the airflow passing through an air intake passage into a vortex configuration is illustrated and generally indicated as 10 in FIGS. 1 through 9. The generated vortex airflow increases the oxidation of fuel and improves the efficiency and fuel economy of an engine.

Referring to FIGS. 1 through 4, the device comprises a cylindrical skirt 11, a plurality of holes 12 in the cylindrical skirt 11 and a plurality of vanes 13 projecting inwardly from the inner surface of the skirt in a radial orientation. The cylindrical skirt 11 comprises a top edge 14, a bottom edge 15 and a slit 16 passing from the top edge to the bottom edge. The slit 16 is slanted at an angle with respect to the longitudinal axis 17 passing through the center of the cylindrical skirt. The slit 16 leaves a gap in the cylindrical skirt. The cylindrical skirt 11 can be resiliently compressed to decrease this gap in order to fit the device 10 inside a multitude of cylindrical air intake passages that comprise different diameters.

The holes 12 are disposed between the top and bottom edges 14 and 15 of the cylindrical skirt. Each of the holes 12 comprises a first side edge 18, a second side edge 19, a curved top edge 20 and a bottom edge 21. The first side edge 18 is parallel to the second side edge 19 and inclined at an angle of 45 degrees with respect to the longitudinal axis 17 of the cylindrical skirt. The bottom edge 21 intersects the first and second side edges 18 and 19 to form chamfered corners.

The vanes 13 project from the first side edges 18 of the holes. The surface area of the vanes 13 is equal to the area of the holes 12. Each of the vanes 13 is comprised of a first planar section 22 and a second planar section 23. The first planar section 22 comprises a first side 24, a second side 25 parallel to the first side 24, a bottom side 26 and a top side 27. The bottom side 26 intersects the first and second sides 24 and 25 to form chamfered corners. The first planar sections 22 project perpendicularly from the inner surface of the cylindrical skirt 11, with their first sides 24 in connection with the first side edges 18 of the holes.

The second planar section 23 is substantially triangular comprising a bottom side, a first side and a second side. The first and second sides intersect to form a convex or curved side 28. The bottom sides are in connection with the top sides 27 of the first planar sections 22. The second planar sections 23 project at an angle of approximately 45 degrees from the first planar sections 22 toward the second side edges 19 of the holes 12.

The device 10 is installed inside a cylindrical air intake passage so that the bottom sides 26 of the first planar sections 22 face upstream of the airflow and the curved sides 28 of the second planar sections 23 face downstream of the airflow. The orientations of the first and second planar sections 22 and 23 create a vortex of air.

Referring to FIGS. 5 through 9, the device is constructed from a rectangular stainless steel plate comprising top 14, bottom 15 and a pair of side edges 29. A plurality of cuts are formed on the steel plate such that they correspond to the second side edges 19, the curved top edges 20 and the bottom edges 21 of the holes 12. The cut sections are bent about the first side edges 18 to an angle of 90 degrees from the surface of the plate, thereby forming the holes 12 and the vanes 13. Each cut section now comprises a top portion corresponding to the second planar section 23 and a bottom portion corresponding to the first planar section 22. The first, second and bottom sides 24, 25 and 26 of the first planar sections 22 correspond to the first, second and bottom edges 18, 19 and 21 of the holes, respectively, and the curved sides 28 of the second planar sections correspond to the curved top edges 20 of the holes 12. The top portion of the cut section is bent about the top side 27 of the first planar section 22 to an angle of 45 degrees towards the second side edges 19 of the holes 12. The plate is rolled to assume a cylindrical configuration, leaving a gap between its side edges 29.

All features disclosed in this specification, including any accompanying claims, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. § 112, paragraph 6. In particular, the use of "step of" in the claims herein is not intended to invoke the provisions of 35 U.S.C. § 112, paragraph 6.

Although preferred embodiments of the present invention have been shown and described, various modifications and substitutions may be made thereto without departing from the spirit and scope of the invention. Accordingly, it is to be understood that the present invention has been described by way of illustration and not limitation.

What is claimed is:

1. A device for creating a vortex of air passing through a cylindrical air intake passage of an engine so that the vortex reaches the combustion chamber of the engine, comprising:
a cylindrical outer skirt having a top edge, a bottom edge, a slit passing from the top edge to the bottom edge and a plurality of symmetrically located holes between the top and bottom edges, each of the holes comprising at least a first edge, a second edge parallel to the first edge, a bottom edge, and a curved top edge, wherein the first edge is slanted at an angle of 45 degrees with respect to the longitudinal axis passing through the center of the cylindrical skirt; and
a plurality of identical and symmetrically arranged vanes projecting inwardly from the inner surface of the skirt and toward the center of the skirt, leaving the longitudinal central portion of the skirt free of the vanes, each of the vanes comprising;
a first planar section having at least a first side being in connection with the first edge of the hole in the cylindrical skirt, a second side parallel to the first side, a top side, and a bottom side, the first planar section is perpendicular to the inner surface of the cylindrical skirt and slanted at an angle of 45 degrees with respect to the longitudinal axis passing through the center of the cylindrical skirt;

a second planar section having at least a first side, a second side, and a bottom side being in connection with the top side of the first planar section, the first and second sides intersect to form a curved profile, the second planar section projects at an angle of 45 degrees from the first planar section towards the second edge of the hole to which the first side of the first planar section is connected; wherein the orientations of the first and second planar sections facilitate in directing the airflow into a vortex configuration.

2. The device of claim 1, wherein the device is formed from and comprises a single piece of metal.

3. The device of claim 1, wherein the slit is at an angle of 45 degrees with respect to the longitudinal axis passing through the center of the cylindrical skirt.

4. The device of claim 1, wherein the slit leaves a gap in the cylindrical skirt such that the device can be resiliently compressed to fit inside the cylindrical air intake passages of different diameters.

5. The device of claim 1, wherein the surface area of the each of the vanes is equal to the area of each of the holes.

6. The device of claim 5, wherein the first, second, and bottom edges of each of the holes correspond to the first, second, and bottom sides of each of the first planar sections, and the curved top edge of each of the holes corresponds to the curved profile formed by the intersection of the first and second sides of each of the second planar sections.

7. The device of claim 1, wherein the bottom edge of each of the holes intersects the first and second edges forming chamfered or filleted corners.

8. The device of claim 1, wherein the bottom side of each of the vanes intersects the first and second sides forming chamfered or filleted corners.

9. The device of claim 1, wherein the bottom sides of the first planar sections face upstream of the airflow.

10. The device of claim 1, wherein the curved profiles formed by the intersection of the first and second sides of the second planar sections face downstream of the airflow.

11. The device of claim 1, wherein the second planar section projects at an angle of 45 degrees from the first planar section.

12. The device of claim 1, wherein the first planar section is slanted at an angle of 45 degrees with respect to the longitudinal axis passing through the center of the cylindrical skirt.

13. The device of claim 1, wherein the device is constructed from a metal plate by creating a plurality of cuts corresponding to all the sides of the first and second planar sections except for the first sides of the first planar sections, by forming the vanes and holes by bending each cut portion about the first sides of the first planar sections, and by rolling the metal plate to assume a cylindrical configuration with the vanes pointing inward.

14. The device of claim 13, wherein the first, second, and bottom edges of each of the holes correspond to the first, second, and bottom sides of each of the first planar sections, and the curved top edge of each of the holes corresponds to the curved profile formed by the intersection of the first and second sides of each of the second planar sections.

15. The device of claim 13, wherein the device is constructed from a stainless steel plate.

16. A method of manufacturing the device of claim 1 comprising the steps of:

creating a plurality of cuts in a rectangular metal plate, the plurality of cuts corresponding to all the sides of the first and second planar sections except for the first side of the first planar sections; forming the vanes and the holes by bending each cut portion about the first side of the first planar sections: and rolling the metal plate to assume a cylindrical configuration with the vanes pointing inward.

* * * * *